United States Patent
Sharpley

(10) Patent No.: US 9,773,265 B2
(45) Date of Patent: Sep. 26, 2017

(54) METHOD AND SYSTEM FOR REMOTE ORDERS

(75) Inventor: John Sharpley, Shawnee, OK (US)

(73) Assignee: Perk Dynamics, LLC, Shawnee, OK (US)

( * ) Notice: Subject to any disclaimer, the term of this patent is extended or adjusted under 35 U.S.C. 154(b) by 1220 days.

(21) Appl. No.: 12/760,212

(22) Filed: Apr. 14, 2010

(65) Prior Publication Data

US 2010/0268378 A1 Oct. 21, 2010

Related U.S. Application Data

(60) Provisional application No. 61/171,178, filed on Apr. 21, 2009.

(51) Int. Cl.
*G06F 17/00* (2006.01)
*G06Q 30/06* (2012.01)
*A47J 31/52* (2006.01)

(52) U.S. Cl.
CPC .......... *G06Q 30/0603* (2013.01); *A47J 31/52* (2013.01)

(58) Field of Classification Search
CPC ............................................... G06Q 30/0603
See application file for complete search history.

(56) References Cited

U.S. PATENT DOCUMENTS

| | | | |
|---|---|---|---|
| 7,840,224 B2 * | 11/2010 | Vengroff et al. | 455/456.1 |
| 7,889,852 B2 | 2/2011 | Whitehead | |
| 8,200,550 B2 * | 6/2012 | Aitkins | 705/26.81 |
| 2002/0095312 A1 * | 7/2002 | Wheat | 705/1 |
| 2003/0069685 A1 * | 4/2003 | Rudd et al. | 701/200 |
| 2003/0195816 A1 * | 10/2003 | Dziaba et al. | 705/26 |
| 2004/0059499 A1 * | 3/2004 | Rudd et al. | 701/207 |
| 2004/0230496 A1 * | 11/2004 | Neuman et al. | 705/26 |
| 2006/0178943 A1 * | 8/2006 | Rollinson et al. | 705/26 |
| 2007/0088624 A1 * | 4/2007 | Vaughn et al. | 705/26 |
| 2007/0114244 A1 * | 5/2007 | Gatipon et al. | 222/129.1 |
| 2008/0201241 A1 * | 8/2008 | Pecoraro | 705/27 |
| 2008/0267107 A1 * | 10/2008 | Rosenberg | 370/312 |
| 2009/0070230 A1 * | 3/2009 | Silverstein et al. | 705/26 |
| 2009/0293733 A1 | 12/2009 | Martin et al. | |
| 2013/0035114 A1 * | 2/2013 | Holden et al. | 455/456.3 |

* cited by examiner

*Primary Examiner* — Mussa A Shaawat
(74) *Attorney, Agent, or Firm* — Haverstock & Owens LLP

(57) ABSTRACT

A system for and method of processing customer orders are disclosed. The system contains an order entry device, software having a database and at least an interface function, an algorithm adapted for selecting the order processing location and adapted for transmitting customer orders to the order processing device. The method of processing customer orders includes collecting the orders at an order entry device such as a point of sale, prioritizing and queuing the orders, identifying the best point of delivery for each order, transmitting the order to the point of delivery and processing the order at the point of delivery. This saves time for the customer and improves the accuracy of filling the orders.

58 Claims, 9 Drawing Sheets

METHOD AND SYSTEM FOR REMOTE ORDERS

CROSS-REFERENCE TO RELATED APPLICATION(S)

This application claims priority under 35 U.S.C. 119(e) of the U.S. Provisional Patent Application Ser. No. 61/171,178, filed Apr. 21, 2009 and entitled, "METHOD AND SYSTEM FOR REMOTE ORDERS," which is hereby incorporated by reference in its entirety for all purposes.

FIELD OF THE INVENTION

The present invention relates to the field of processing orders. More specifically, the present invention relates to the field of receiving, collecting, queuing, load balancing, scheduled usage and dispatching orders to specific remote coffee and espresso machines for processing the orders.

BACKGROUND OF THE INVENTION

Customers desiring a cup of specialized coffee recipes such as cappuccino or espresso must come to a physical point of sale which may be a counter or an automated machine and either wait in line, or physically key a specific drink order or drink type into a machine. Often, the customer does not know the closest machine or counter to go to. When the order is keyed into the point of sale system, it is then typically written on a cup or printed on a label stuck to a cup and set near the Barista for preparation. This is inconvenient and time consuming. This order processing method allows orders to be made out of sequence, misread or forgotten.

SUMMARY OF THE INVENTION

A system for and method of processing customer orders are disclosed. The system contains an order entry device, software having a database and at least an interface function, an algorithm adapted for selecting the order processing location and adapted for transmitting customer orders to the order processing device. The method of processing customer orders includes collecting the orders at an order entry device such as a point of sale, prioritizing and queuing the orders, identifying the best point of delivery for each order, transmitting the order to the point of delivery and processing the order at the point of delivery. This saves time for the customer and improves the accuracy of filling the orders.

In one aspect, a network of devices comprises an order entry device for entering an order, a data device for processing the order received from the order entry device and a dispensing device for dispensing an item based on the order processed by the data device. The order entry device is selected from the group consisting of a grocery/check out machine, a checkout kiosk, a point of sale device, a mobile device, a personal computer, a laptop, a netbook and a kiosk. The dispensing device further comprises a brewing device. The dispensing device contains one or more recipes for preparing the item to be dispensed. The dispensing device is selected from the group consisting of a manual device, a semi-automatic device and a fully automatic device. The dispensing device is selected from the group consisting of an espresso brewing machine, a coffee brewing machine, a tea brewing machine, a soup brewing machine, an ice cream machine, a smoothie machine and an iced coffee/tea machine. The data device further comprises an application for selecting an order processing location and transmitting the order to the dispensing device at the order processing location. The data device is for storing statistical data and performance data. The data device is for storing error data. The data device is for storing alerts. Data stored in the data device is stored in a database and is reported to a reporting system. The reporting system dispatches the data to a messaging system. The data device receives the order in a first format and translates the order into a second format that the dispensing device understands. The data device determines a delivery location based upon at least one of order parameters, a GPS location and a selected delivery location. The data device records data of all items dispensed. The data device maintains an order queue to prioritize orders. The data device implements load balancing wherein orders are sent to various dispensing devices to maintain a balanced load on the dispensing devices. The dispensing device includes an order queue display to enable a user to view an order queue. The data device enables future orders to be placed. To remotely change the recipes, the data device changes at least one of settings and recipes on the dispenser device. To remotely change the recipes, the data device sends a base setting to dispenser devices and delta settings based on a location of each of the dispenser devices.

In another aspect, a system for processing customer orders programmed in a memory on a device comprises an order acceptance module for accepting orders, an order flow module for controlling a flow of the orders received from the order acceptance module and a dispenser interface module for providing dispensing control of the orders received from the order flow module. The orders are selected from the group consisting of point of sale orders, kiosk orders, web orders, mobile orders, point of service orders and remote orders. Controlling the flow of the orders includes controlling a queue of the orders, implementing flags to re-order an order and controlling staged orders. Providing dispensing control includes providing load leveling across multiple machines, sequence integrity of the orders, re-order data capture and machine control. The dispensing interface module is further for translating commands from a first format to a second format.

In another aspect, a method of processing customer orders comprises collecting the orders at an order entry device, transmitting the orders to a point of delivery device and processing the orders at the point of delivery device. The method further comprises prioritizing and queuing the orders. The method further comprises identifying the point of delivery device for each of the orders. Transmitting the orders to the point of delivery device includes translating the orders from a first format to a second format. The method further comprises updating machine settings at the point of delivery device. Collecting the orders includes a customer ordering without verbal communication. The point of delivery device comprises a brewing and dispensing device. The point of delivery device comprises one or more recipes which are utilized to process the orders. The method further comprises determining a location of the point of delivery device based upon at least one of order parameters, a GPS location and a selected delivery location. The method further comprises maintaining an order queue to prioritize the orders. The method further comprises implementing load balancing wherein the orders are sent to various point of delivery devices to maintain a balanced load on the point of delivery devices.

In another aspect, a device comprises a memory for storing an application, the application for communicating with an order entry device and communicating with a point of delivery device and a processing component coupled to the memory, the processing component for processing the application. The application is further for prioritizing and queuing orders. The application is further for identifying the point of delivery device for orders. The application is further for transmitting orders to the point of delivery device including translating the orders from a first format to a second format. The application is further for updating machine settings at the point of delivery device. The point of delivery device comprises a brewing and dispensing device. The point of delivery device comprises one or more recipes which are utilized to process orders. The application is further for determining a location of the point of delivery device based upon at least one of order parameters, a GPS location and a selected delivery location. The application is further for implementing load balancing wherein orders are sent to various point of delivery devices to maintain a balanced load on the point of delivery devices.

In yet another aspect, a system for collecting and storing data comprises a beverage making and dispensing device and a data device containing an application having a database and an interface that collects the data from the beverage making and dispensing device and stores the data in the database. The beverage making and dispensing device and the data device communicate using at least one of a serial protocol and a network protocol. The data comprises statistical data and performance data. The data comprises error data. The data comprises alerts. The data is stored in a database and is reported to a reporting system. The reporting system dispatches the data to a messaging system.

In another aspect, a delivery device comprises a receiving component for receiving an order from a data device, a processing component for processing the order received from the data device and a dispensing component for dispensing an item based on the order. The receiving component receives the order utilizing at least one of a serial protocol and a network protocol. The processing component processes the order using a recipe contained within the dispensing device. The processing comprises brewing a beverage. The processing component is further for updating settings of the delivery device.

DETAILED DESCRIPTION OF THE PREFERRED EMBODIMENT

The method of and system for processing remote orders collects orders from an ordering device such as a Point of Sale (POS) device and queues the orders into an automated or semi-automated espresso and/or cappuccino machine instead of utilizing human involvement to stage the orders.

The method of and system for processing remote orders automates order entry into one or more coffee drink preparation machines. Software implemented in the method and system stages drink orders based on expected delivery times, queues the order into an available coffee drink preparation machine, and displays the order details on the coffee drink preparation machine's screen enabling the operator to add any unique or manual drink components. On capable machines, the next order is queued up and displayed on the machine's screen for advance preparation of additional ingredients not available through the coffee drink preparation machine.

Figure 1:
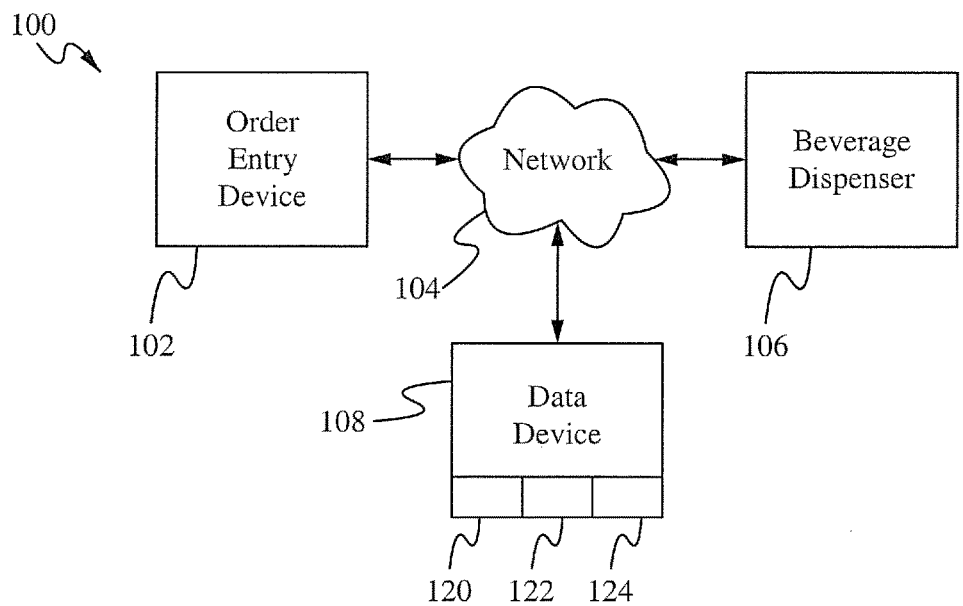
FIG. 1 illustrates a block diagram of a network of devices for processing remote orders according to some embodiments.

FIG. 1 illustrates a block diagram of a network of devices for processing remote orders according to some embodiments. The network of devices 100 includes an order entry device 102, a network 104, a beverage dispenser 106 and a data device 108.

The order entry device 102 is any device that enables a user to place an order. Examples of an order entry device 102 include, but are not limited to, a grocery/check out machine, a checkout kiosk, a point of sale device, a mobile device such as a mobile phone, a personal computer/laptop/netbook, a kiosk or any other capable device. With a check out machine, a user is able to input an order using a touch screen. With a mobile device, a user is able to use buttons, keys or a touch screen to input an order. Similarly, a personal computer, laptop, netbook or similar device enables a user to place an order such as a web order using an input mechanism. In some embodiments, the order includes only submitting an order request, and in some embodiments, the order includes submitting the order request and paying for the purchase. In some embodiments, the order is able to be placed without verbal communication.

The network 104 is able to be any type of network including, but not limited to, a LAN, a WAN, the Internet, a cellular network, a wireless network, a wired network and/or any combination thereof. In some embodiments, the network 104 is a direct connection such as a serial connection. In some embodiments, the devices are coupled directly to each other without the network 104.

The beverage dispenser 106 is any device capable of dispensing a beverage. In some embodiments, the beverage dispenser 106 is able to prepare a drink order/type and dispense the product of the order. For example, instead of merely dispensing pre-made coffee, the beverage dispenser 106 utilizes a recipe and combines each element of the recipe according to the recipe and processes/prepares the beverage and dispenses the beverage into a beverage container such as a cup. Recipes are able to be added, removed or modified from the beverage dispenser 106. The beverage dispenser 106 is able to be any appropriate device such as an espresso brewing machine, a coffee brewing machine, a tea brewing machine, a soup brewing machine, an ice cream machine, a smoothie machine, an iced coffee/tea machine and any other capable machine. Any type of beverage or other item is able to be prepared and dispensed such as coffee, espresso, tea, iced coffee/tea, a milk shake, an ice cream shake, a smoothie, soup, hot cereal and any other beverage or item. In some embodiments, the dispenser 106 is able to dispense items instead of or in addition to beverages. In some embodiments, the beverage dispenser 106 is located in the same building as the order entry device 102, and in some embodiments, the beverage dispenser 106 is located remote from the order entry device 102. The beverage dispenser 106 is able to be a manual device, a semi-automatic device or a fully automated device. For example, a manual device utilizes an operator to manually prepare an item, and a fully automated device prepares the item without any involvement (or possibly with very little involvement) of the user. In some embodiments, the beverage dispenser 106 includes an order queue display to enable a user to view the order queue.

The data device 108 is any device that is able to receive, process and/or send information to/from the order entry device 102 and/or the beverage dispenser 106. For example, the data device 108 accepts orders from a POS system. In some embodiments, the data device 108 translates communications received in a first format or language from the order entry device 102 to a second format or language that the beverage dispenser 106 understands. For example, the data device 108 translates eXtensible Markup Language (XML) messages from a POS to a format/language understandable by a coffee machine such as Comma-Separated Value (CSV), tab-delimited, other delimited, flat file and any other format. In an additional example, the order confirmation from the coffee machine is translated to the POS system.

In some embodiments, the data device 108 records all drinks dispensed, including manually produced drinks and drinks produced offline. In some embodiments, error, status and performance data is communicated to the data device 108. As described herein, error data includes any data recorded when there is an error in the system (e.g. a coffee maker is not making coffee because it is out of water). The error data is able to include codes defined for each type of error, machine information, location information and any other relevant information. Status data is able to include information regarding the status of a system or elements within the system. For example, espresso machine A is "on/ready," espresso machine B is "on/busy" and espresso machine C is "offline." Performance data is able to include information regarding how the system and/or elements of the system are performing. The performance data in some embodiments includes data of how locations are performing such as Location X is selling $M worth of product, while Location Y is only selling $N worth of product. In some embodiments, statistical data is able to be calculated and recorded by the data device 108. Statistical data is able to include any statistics relevant to the system and elements in the system such as productivity, workload, error information, financial information, maintenance information and any other information. In some embodiments, alert data is communicated and/or stored on the data device 108. The alert data includes alert messages such as "machine is out of beans" or "machine is out of milk." Any other alert information is able to be included as well. In some embodiments, the error, status, performance, statistical, alert data and/or other data is stored in a database in the data device 108 or another device. In some embodiments, the data stored in the database is able to be delivered to a reporting system, for example, a report is generated based on the data. In some embodiments, the report is dispatched to a messaging system. The report is able to be dispatched using any messaging implementation such as Short Message Service (SMS), email, service dispatch or any other implementation.

The data device 108 is able to process any order depending on the configuration. In some embodiments, the data device 108 processes order requests/POS transactions. In some embodiments, the data device 108 accepts and processes web orders. In some embodiments, the data device 108 maintains an order queue priority so that orders placed are processed in the correct order such as first in first out. The data device 108 dispatches an order by sending it to the beverage dispenser 106 or another system or person to process the order.

In some embodiments, the data device 108 maintains an order machine queue and implements load balancing so that orders are sent to various machines to keep the load of the machines balanced. In some embodiments, the order machine queue spans an area such as a city-wide area, so that a user is able to be sent to a location with less business. For example, if a user is driving and would like a coffee, he uses his mobile phone to place an order. Based on his location (e.g. GPS location) and the machine queue information, he is directed to store X since there is no wait for coffee there and it is within a reasonable distance. The user is able to configure settings for such an implementation. For example, a user selects to pick up the coffee at the closest location regardless of wait time. In another example, the user selects to pick up the coffee with the shortest wait time but within 1 mile of his current position. Any other options are able to be configured as well such as only certain stores/shops, a future position, only drive-thrus and stores with food.

In some embodiments, the data device 108 is able to present the order queue display on a user's device (e.g. mobile device) or another device. In some embodiments, if the order is processed and there is an error and the order is reprocessed, the data device 108 is able to implement the reprocessing in an appropriate manner. In some embodiments, information is able to be recorded even when a dispenser is offline.

In some embodiments, future orders are able to be placed. For example, if at 5:00 pm, a user plans on being at a location at 8:00 pm and wants to have a cup of coffee waiting for them, they are able to place a future order so that the order is prepared to be ready at 8:00 pm. In some embodiments, periodic future orders are able to be placed. For example, if every morning during the workweek, a user stops at a coffee location at 5:00 am, the user is able to set a schedule so that every day of the workweek, his coffee is ready for him at that location at that time.

In some embodiments, the data device 108 is able to be used to change settings and/or recipes on the beverage dispenser 106. For example, for a latte machine, the grind time, the pre-infusion time, the milk amount or other recipe settings are able to be modified.

In some embodiments, the data device 108 includes modules for providing the functionality described herein. For example, the data device 108 includes an order acceptance module 120, an order flow module 122 and a dispenser interface module 124. The order acceptance module 120 is able to accept orders such as POS orders, kiosk orders, web orders, mobile POS orders, point of service orders, remote orders, other device orders, and in some embodiments, the orders are able to include payment. The order flow module 122 is able to control queues (e.g. using first in first out), flags to re-order back to a POS system and staged orders. The dispenser interface module 124 is able to provide load leveling across multiple machines, sequence integrity of orders, re-order data capture and complete machine control.

An example of an order in XML from a POS system is described. In some embodiments, communication with the POS/ordering device is via XML; however any form of communication is available such as Comma-Separated Value (CSV), tab-delimited, other delimited, flat file and any other form. As is shown below, the exemplary order includes store information, an order number, customer information and item information. More or less information is able to be included depending on the implementation.

```
<Order>
        <StoreID>1</StoreID>
        <POSID>123</POSID>
        <OrderNumber>22222</OrderNumber>
        <CustID>12345</CustID>
        <LoyaltyNumber>9932898322</LoyaltyNumber>
        <CustName>John Doe</CustName>
        <CustAddr>123 W 5th St</CustAddr>
        <CustCity>Oklahoma City</CustCity>
        <CustState>OK</CustState>
        <CustZip>73111</CustZip>
        <CustEmail>john.doe@test.com</CustEmail>
        <PickupTime>Now</PickupTime>
        <PickupLocation>Cafe1</PickupLocation>
        <TableID>1</TableID>
        <WaiterID>123</WaiterID>
        <CashierID>456</CashierID>
        <HereTogo>Here</HereTogo>
    <Items>
    <Item>
        <TranLineID>1</TranLineID>
        <ItemNumber>12345</ItemNumber>
        <ItemName>Large Latte</ItemName>
        <Qty>1</Qty>
        <Price>3.00</Price>
        <DrinkOptions>No Whip</DrinkOptions>
    </Item>
    <Item>
```

Figure 2:
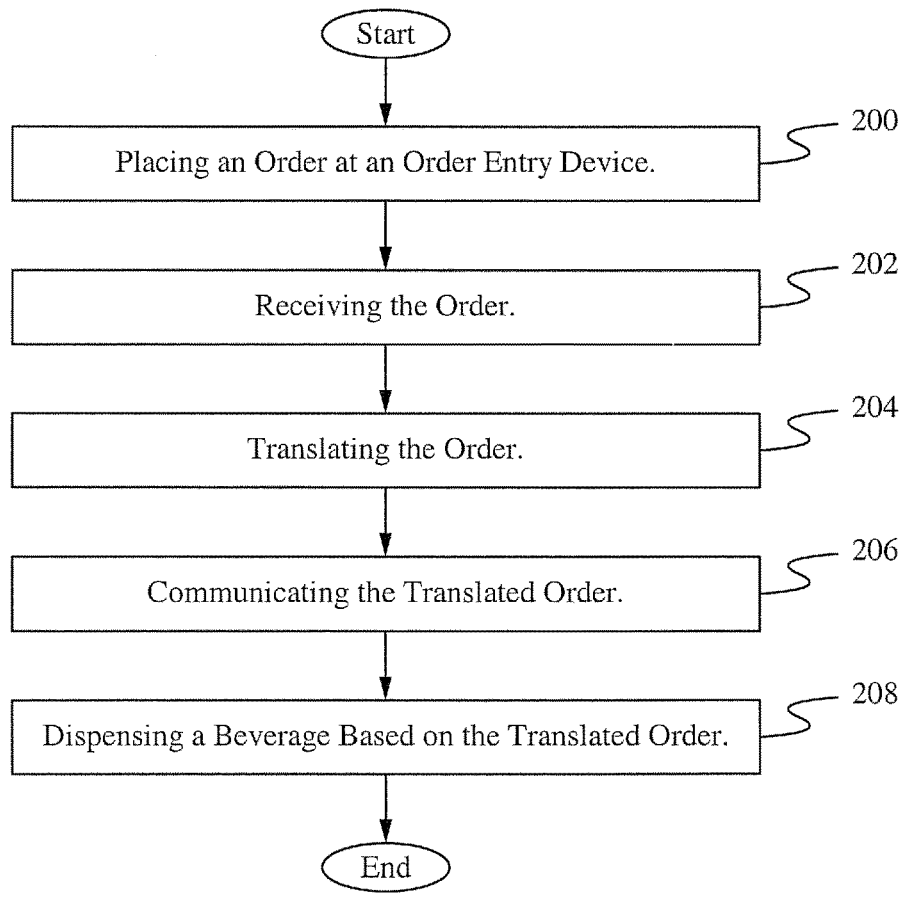
FIG. 2 illustrates a flowchart of a method of implementing a remote ordering system according to some embodiments.

FIG. 2 illustrates a flowchart of a method of implementing a remote ordering system according to some embodiments. In the step 200, an order is placed/collected at an order entry device. For example, a person uses his mobile phone to place an order for a mocha cappuccino. In some embodiments, placing an order includes paying for the order. In the step 202, a data device receives the order. In the step 204, the data device translates the order to a language that a beverage dispenser is able to understand. In the step 206, the data device communicates the translated order to the beverage dispenser. In the step 208, the beverage dispenser dispenses the beverage to be made available to the user. In some embodiments, fewer or additional steps are able to be implemented. Additionally, the order of the steps is able to be modified.

Figure 3:
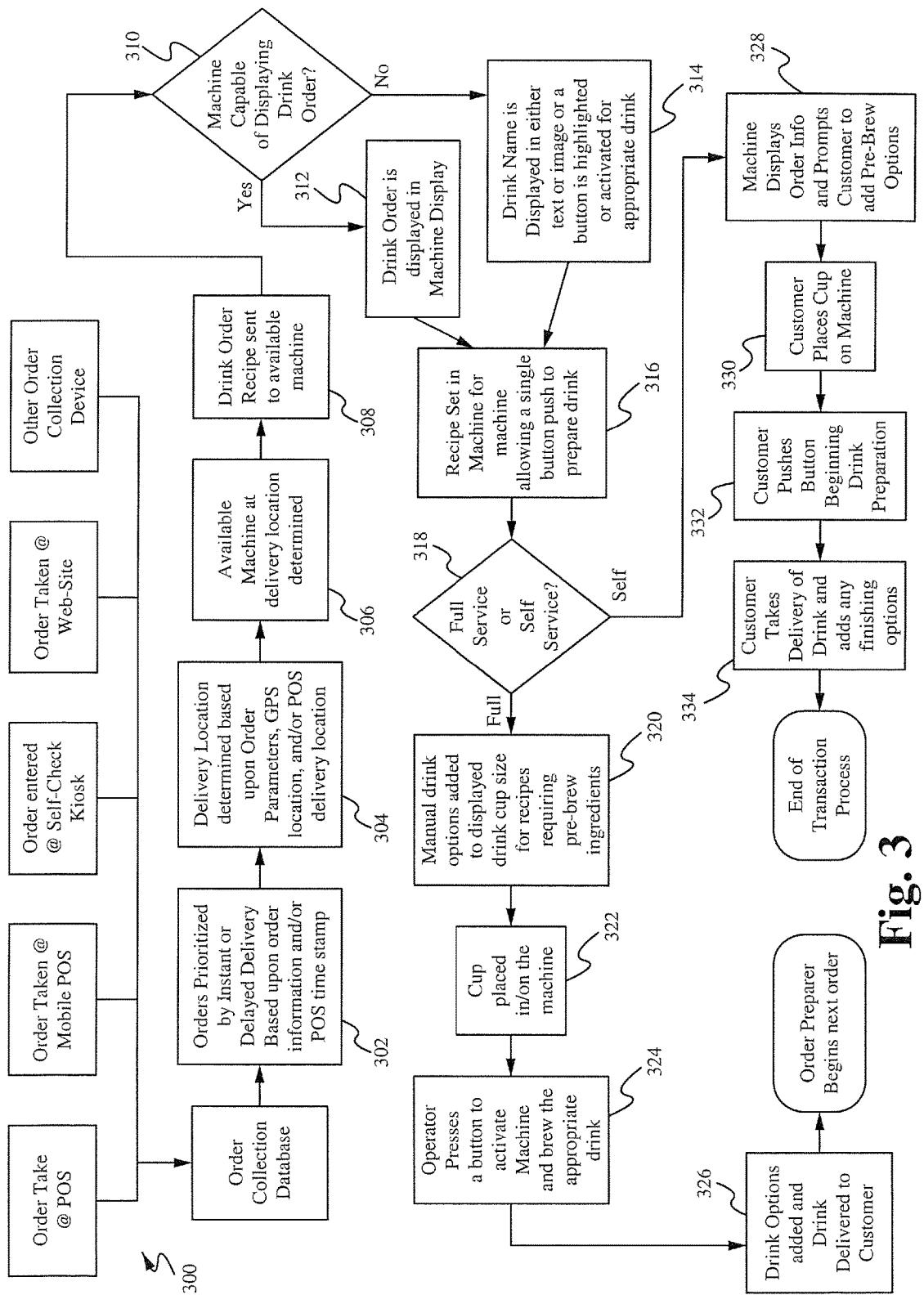
FIG. 3 illustrates a flowchart of a method of implementing a remote ordering system according to some embodiments.

FIG. 3 illustrates a flowchart of a method of implementing a remote ordering system according to some embodiments. In the step 300, orders are collected from POS device(s), mobile POS device(s), self-checkout kiosk(s), web-site order(s), or other order collection devices. In the step 302, orders are prioritized by instant delivery or delayed delivery based upon order information and/or POS time stamp. In the step 304, the delivery location is determined based upon order parameters, GPS Location, POS delivery location, and/or customer selected delivery location. In the step 306, the best available machine for delivery is determined. In the step 308, the drink order recipe is electronically sent to the available machine.

In the step 310, it is determined if the machine is capable of drink order display. If the machine is capable of displaying the drink type/order and drink modifiers, the drink options are displayed in the machine display, in the step 312. In some embodiments, the machine also displays the "Next Up" drink options allowing drink pre-prep and is able to display multiple drinks that are in the queue. If the machine is not capable of displaying the drink order, the drink name is displayed in either text or image or a button is highlighted or activated for the appropriate drink, in the step 314. In the step 316, the drink recipe is set in the machine allowing a single action to activate the brewing action, which is able to be a button push, a touch of a touch screen interface or a wave of an RFID tag to prepare and/or brew a drink. In the step 318, it is determined if the order is processed at a full service location or a self service location.

If the order is processed at a full service location, then the operator reads the drink order to prepare off of the machine screen, the operator selects a proper drink cup size based off of the drink order displayed, or an automated machine presents the proper cup based upon the drink order information, and the operator adds manual pre-brew ingredients required for drink, in the step 320. In the step 322, the operator places a cup in/on the machine. In the step 324, the operator pushes a button (or touches a touch screen button, or any other action) to activate program drink recipe brewing sent to the machine by the interface program. In the step 326, final drink options are added to the drink, and the drink is delivered to customer.

If the order is processed at a self service kiosk, then the machine displays the order information and prompts the customer to add pre-brew options and then places the drink on the machine, in the step 328. If the machine is capable of auto-dispensing a cup, it dispenses the cup, and in the step 330, the customer places the cup in/on the machine. In the step 332, the customer pushes a button (or touches a touch screen or any other action to activate), beginning drink preparation to include but not limited to, coffee brew, milk prep, and other machine capable options. In the step 334, the customer takes delivery of the drink and adds side ingredients. In some embodiments, fewer or additional steps are able to be implemented. Additionally, the order of the steps is able to be modified.

Figure 4:
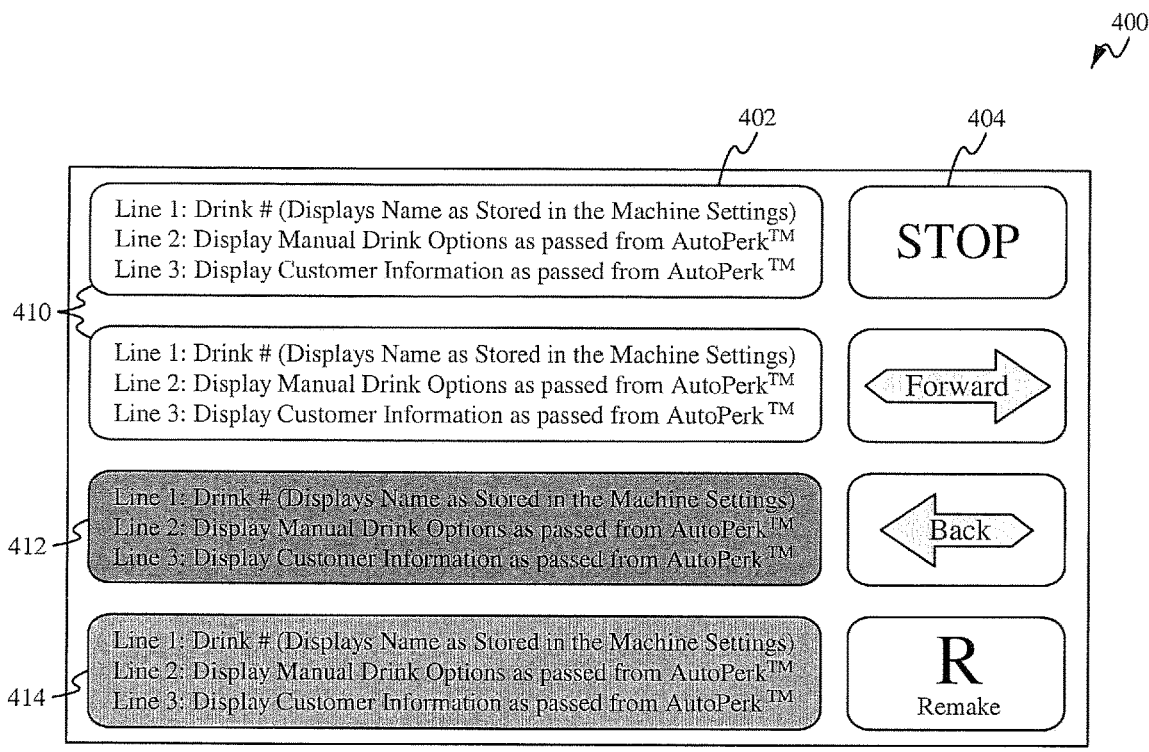
FIG. 4 illustrates an exemplary screen of a dispensing device according to some embodiments.

FIG. 4 illustrates an exemplary screen of a dispensing device according to some embodiments. The screen 400 includes display messages 402 and buttons 404. The display messages 402 are able to be separated into different categories of display messages such as "next up" messages 410, a "current" message 412 and "last" messages 414. In each of the display messages 402, the drink number, manual drink options and customer information are all displayed. The "next up" messages 410 and the "last" messages 414 are only displayed and are not actionable. The "current" message 412 is actionable; for example, on a touch screen display, if a user touches the "current" message 412, the brew cycle is activated and the drink is made. The display messages 402 are cycled as new orders are placed and orders are fulfilled. The buttons 404 are able to be used to cycle through the display messages 402 and take actions such as stop, remake, forward and back. When the "stop" button is pressed, the current brew is canceled and a message is sent to the data device. When the "back" button is pressed, the machine sends the "last drink back" message to the data device which responds with a drink back in the drink queue and moves the messages back. When the "forward" button is pressed, the machine sends the "last drink forward" message to the data device which responds with a drink forward in the drink queue and moves the messages forward. When the "remake" button is pressed, the drink in the last drink displayed area is remade. The screen 400 is merely an example, and other configurations of messages or buttons including fewer or more messages and/or buttons are able to be implemented.

Figure 5:
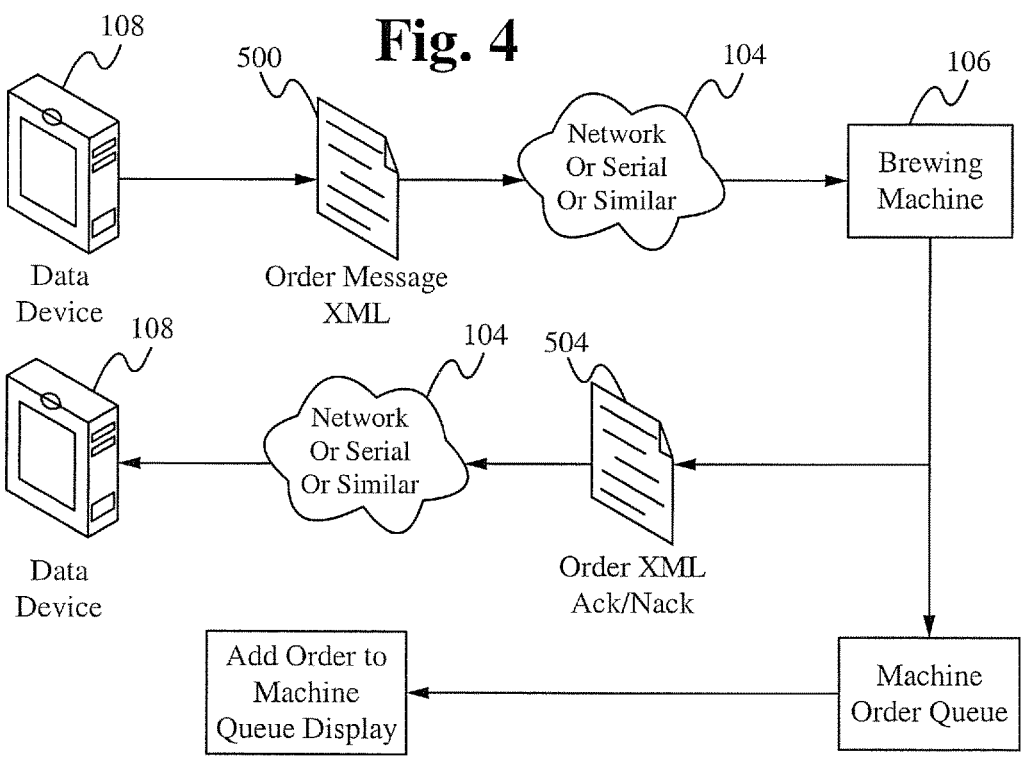
FIG. 5 illustrates a diagram of the flow of an order message according to some embodiments.

FIG. 5 illustrates a diagram of the flow of an order message according to some embodiments. After the data device receives an order message, the data device sends an XML order message 500 through the network 104 or similar implementation to a brewing/dispensing device 106. The brewing/dispensing device 106 then sends an XML order acknowledgment or no acknowledgment 504 back to the data device 108 through the network 104. The brewing/dispensing device 106 also sends data to a machine order queue to add the order to the machine queue display.

Figure 6:
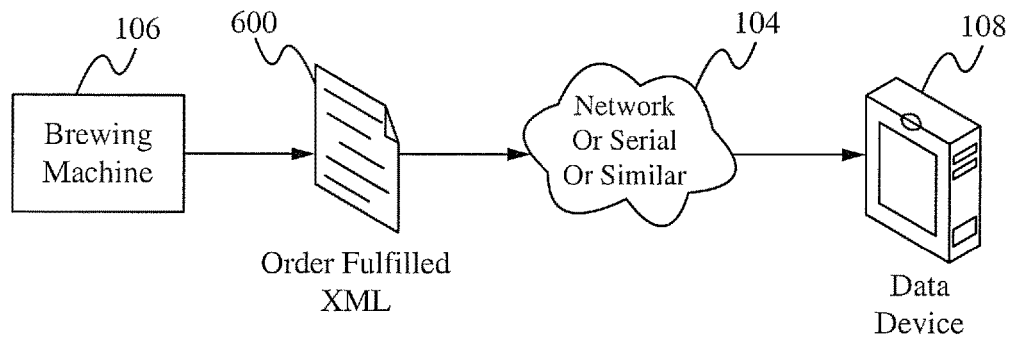
FIG. 6 illustrates a diagram of order fulfillment messaging according to some embodiments.

FIG. 6 illustrates a diagram of order fulfillment messaging according to some embodiments. The brewing/dispensing device 106 sends an order fulfilled XML message 600 through the network 104 to the data device 108. The order fulfilled XML message 600 is able to indicate that the order completed successfully, was not completed due to a manual stop or was not completed due to an error and an error code is included or any other fulfillment message.

Figure 7:
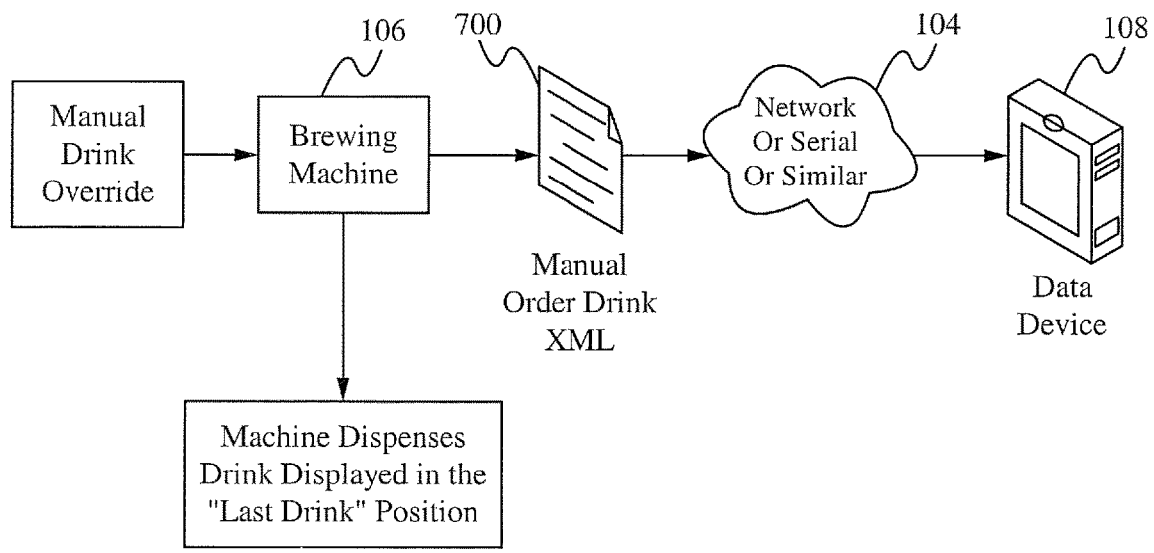
FIG. 7 illustrates a diagram of a manual drink override prepared according to some embodiments.

FIG. 7 illustrates a diagram of a manual drink override prepared according to some embodiments. A manual drink override is initiated which is sent to the brewing/dispensing device 106. The brewing/dispensing device 106 dispenses the drink displayed in the last drink position. An XML manual drink order 700 is sent via the network 104 to the data device 108.

Figure 8:
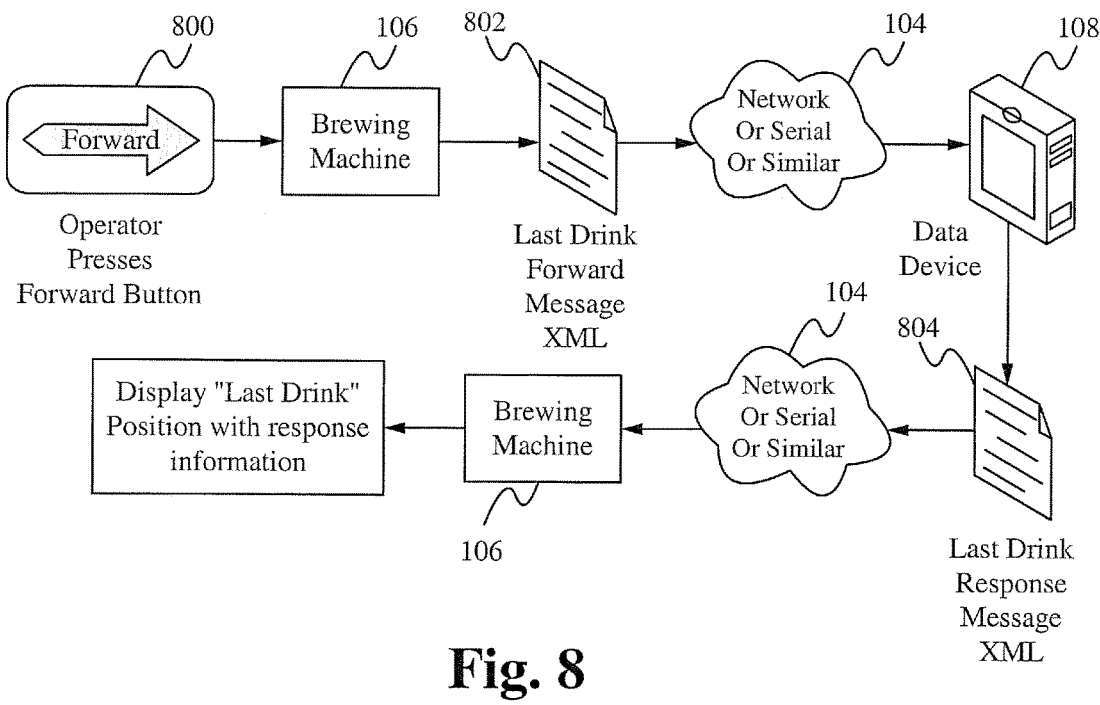
FIG. 8 illustrates a diagram of going forward for the last drink according to some embodiments.

FIG. 8 illustrates a diagram of going forward for the last drink according to some embodiments. When an operator pushes the "forward" button 800 on a system screen, the brewing/dispensing device 106 sends a last drink forward XML message 802 through the network 104 to the data device 108. The data device 108 sends a last drink response XML message 804 through the network 104 to the brewing/dispensing device 106 which displays the "last drink" position with response information.

Figure 9:
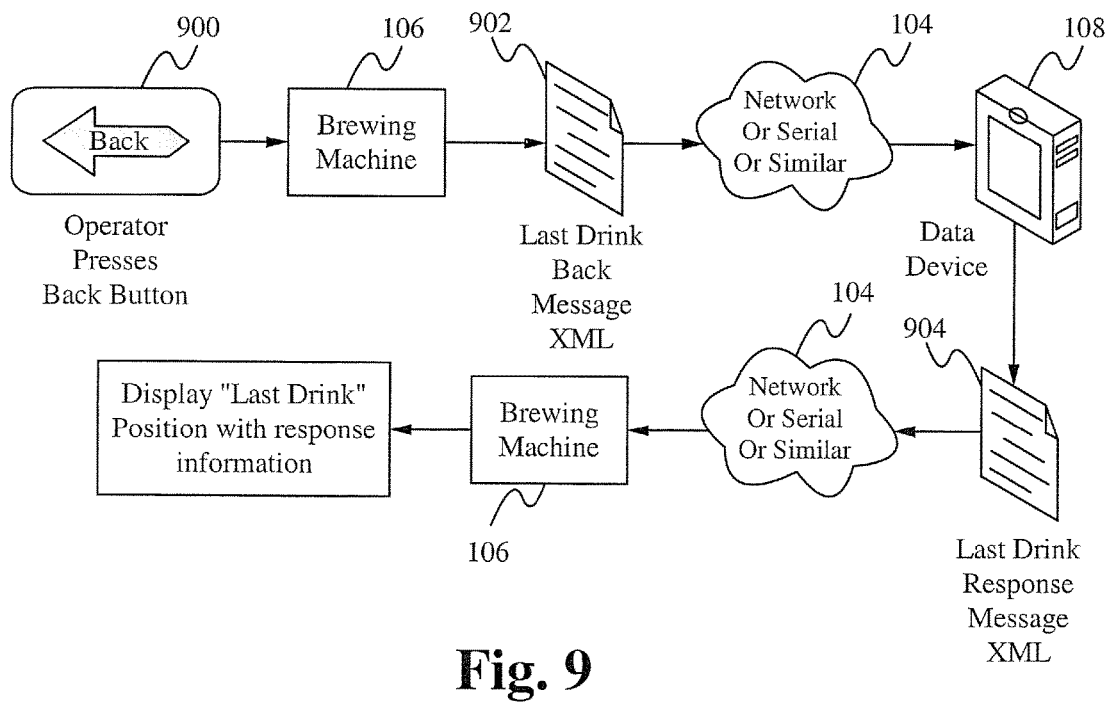
FIG. 9 illustrates a diagram of going back for the last drink according to some embodiments.

FIG. 9 illustrates a diagram of going back for the last drink according to some embodiments. When an operator pushes the "back" button 900 on a system screen, the brewing/dispensing device 106 sends a last drink back XML message 902 through the network 104 to the data device 108. The data device 108 sends a last drink response XML message 904 through the network 104 to the brewing/dispensing device 106 which displays the "last drink" position with response information.

Figure 10:
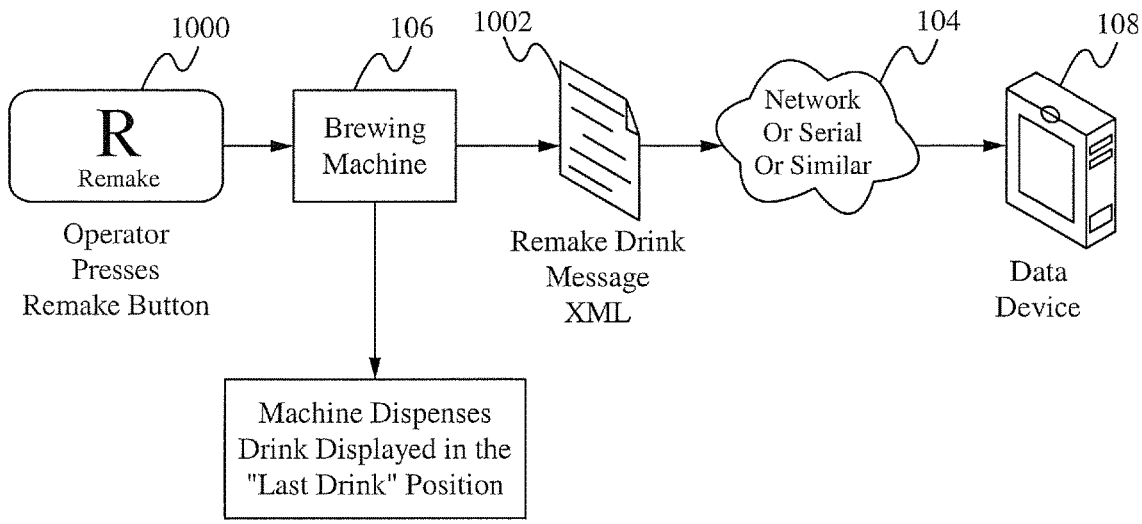
FIG. 10 illustrates a diagram of remaking a drink message according to some embodiments.

FIG. 10 illustrates a diagram of remaking a drink message according to some embodiments. When an operator pushes the "remake" button 1000 on a system screen, the brewing/dispensing device 106 sends a remake drink XML message 1002 through the network 104 to the data device 108. The brewing/dispensing device 106 dispenses the drink displayed in the "last drink" position.

Figure 11:
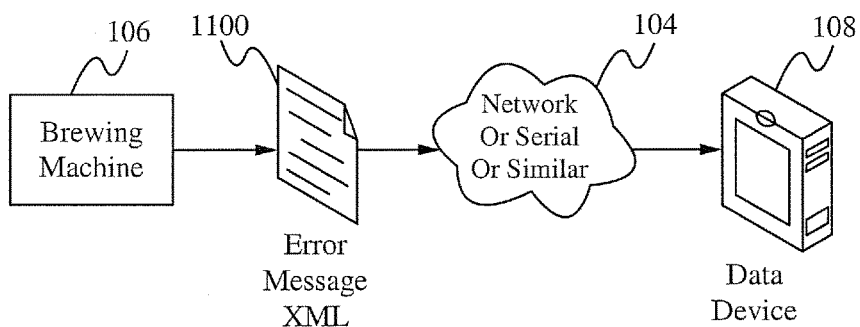
FIG. 11 illustrates a diagram of error code alerts and messages according to some embodiments.

FIG. 11 illustrates a diagram of error code alerts and messages according to some embodiments. The brewing/dispensing device 106 sends an XML error message 1100 to the data device 108 through the network 108. Error messages, alerts and all other messages are sent to the data device 108. For example, the messages include a start and stop on cleanings as in multi-machine locations are able to re-route drinks from the in-maintenance or otherwise unavailable machine to an available machine. Additionally, all drinks made through the data device, manual override, technician mode or other modes are reported to the data device.

Figure 12:
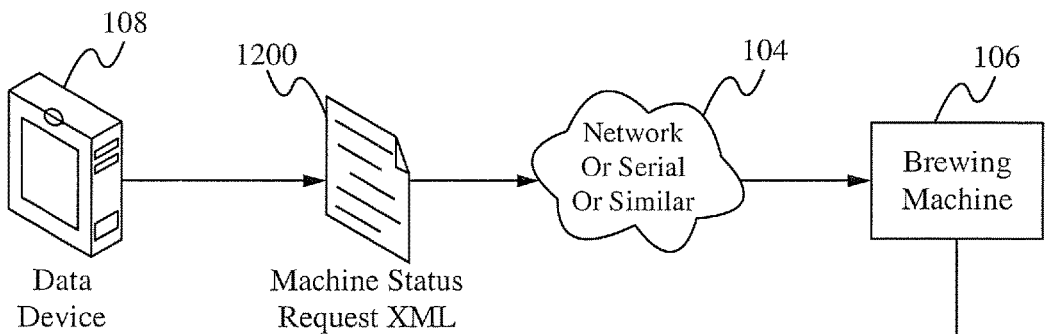
FIG. 12 illustrates a diagram of presenting machine status information according to some embodiments.
Figure 12:
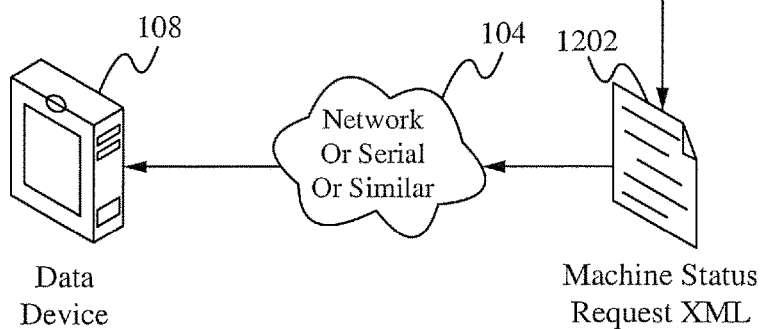

FIG. 12 illustrates a diagram of presenting machine status information according to some embodiments. The data device 108 sends a machine status XML request 1200 to the brewing/dispensing machine 106 through the network 104. The brewing/dispensing machine 106 then sends a machine status XML response 1202 to the data device 108 through the network 104.

Figure 13:
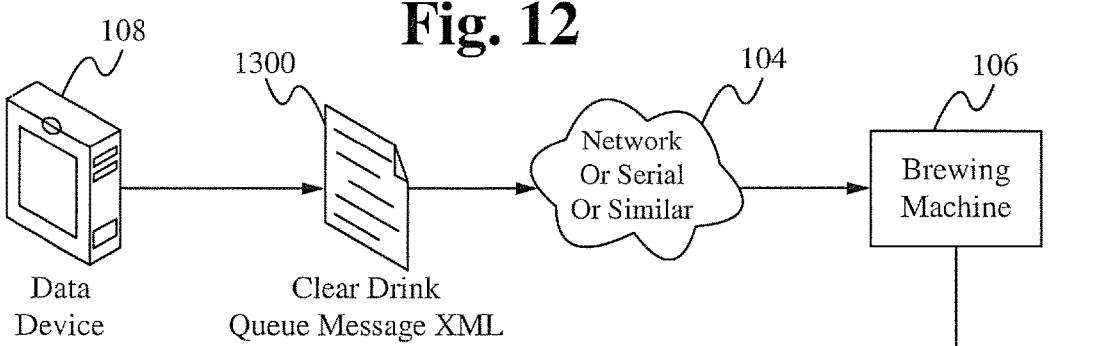
FIG. 13 illustrates a diagram of deleting unbrewed drinks in a queue according to some embodiments.
Figure 13:
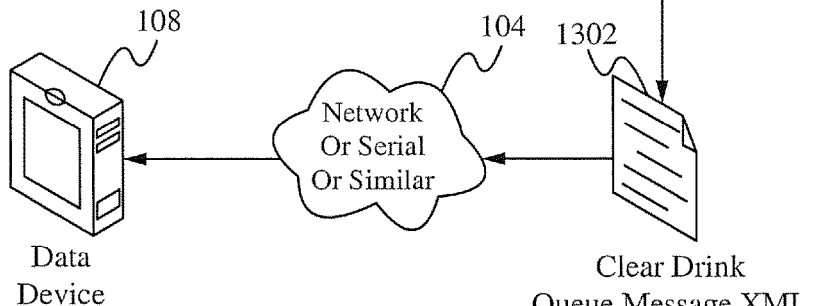

FIG. 13 illustrates a diagram of deleting unbrewed drinks in a queue according to some embodiments. The data device 108 sends a clear drink queue XML message 1300 to the brewing/dispensing machine 106 through the network 104. Unbrewed drinks are removed from the display queue and the display queue shows no pending drinks. The brewing/dispensing machine 106 sends a clear drink queue XML response 1302 to the data device 108 through the network 104.

Figure 14:
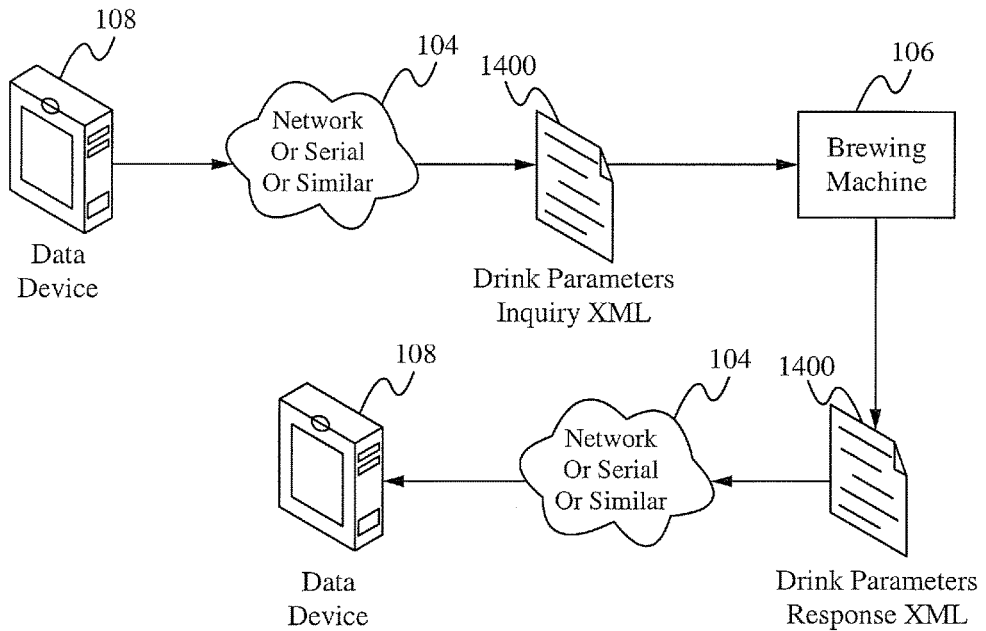
FIG. 14 illustrates a diagram of reading drink parameters according to some embodiments.

FIG. 14 illustrates a diagram of reading drink parameters according to some embodiments. The data device 108 sends a drink parameters XML inquiry 1400 to the brewing/dispensing machine 106 through the network 104. The brewing/dispensing machine 106 sends a drink parameters XML response 1402 to the data device 108 through the network 104.

Figure 15:
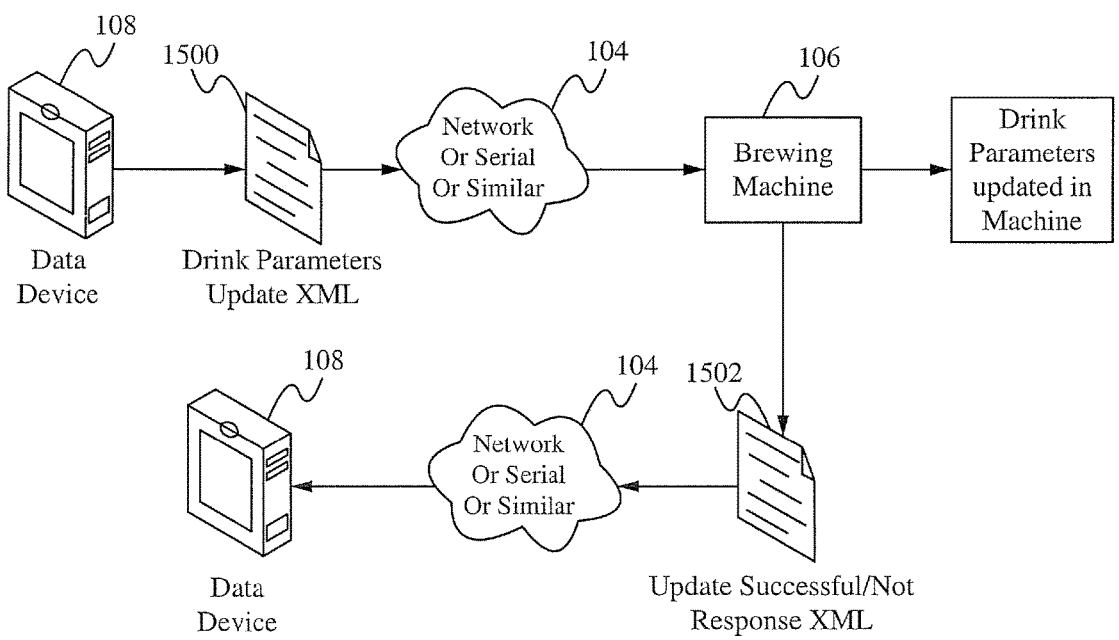
FIG. 15 illustrates a diagram of updating drink parameters according to some embodiments.

FIG. 15 illustrates a diagram of updating drink parameters according to some embodiments. The data device 108 sends a drink parameters XML update 1500 to the brewing/dispensing machine 106 through the network 104. The brewing/dispensing machine 106 updates drink parameters in the machine 106. The brewing/dispensing machine 106 sends a drink parameters update XML successful/not successful response 1502 to the data device 108 through the network 104. In some embodiments, the update is able to be from a centralized location to distributed sites. For example, a base recipe is distributed to all of the local brewing/dispensing machines, and then deltas or differences are able to be sent/used based on the specific location. For example, a base recipe for making coffee includes brewing the coffee for 20 seconds which is the desired amount of time at sea level, but a delta is also sent which increases the infusion time to 23 seconds for locations at higher elevation.

Figure 16:
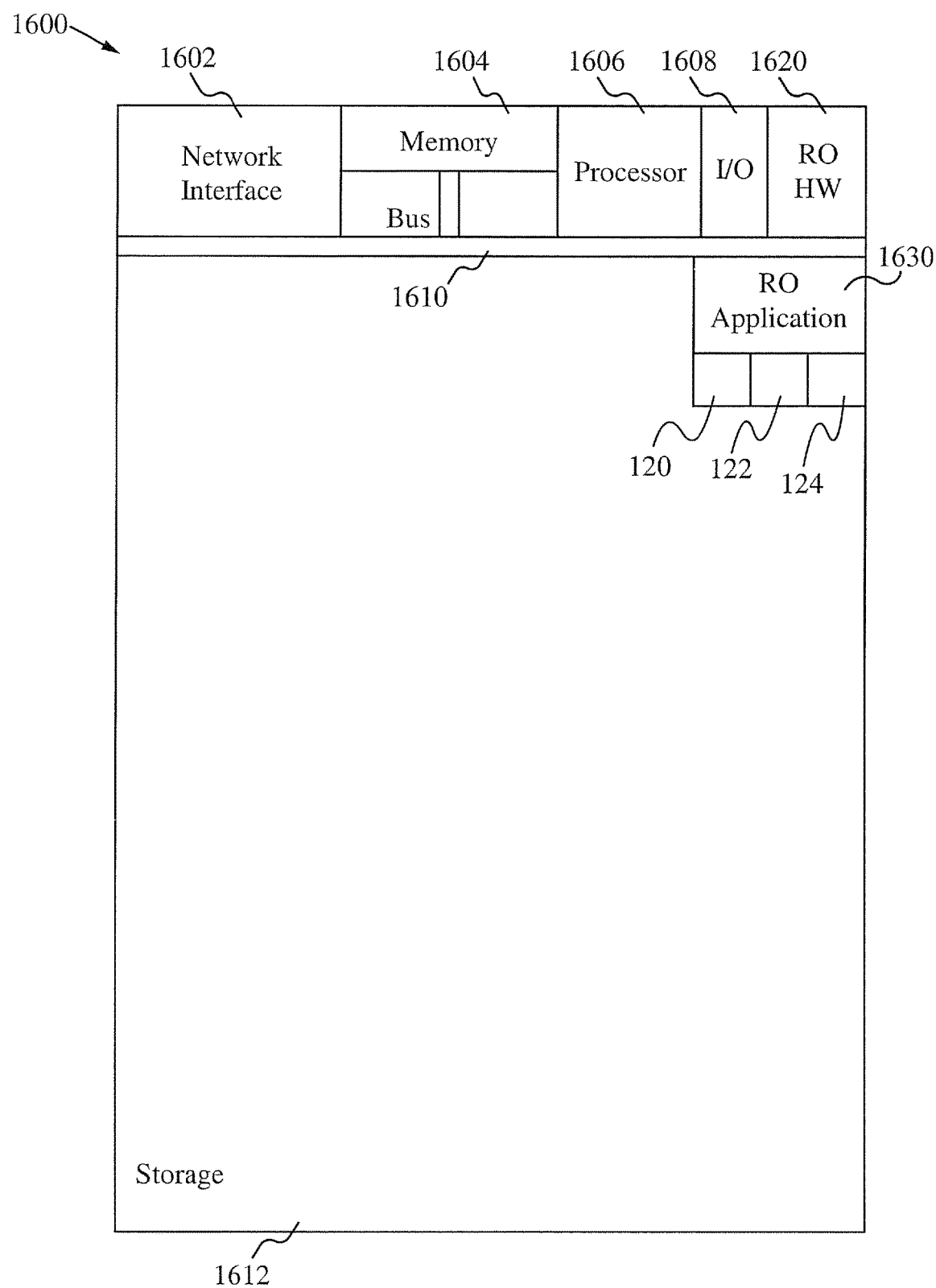
FIG. 16 illustrates a block diagram of an exemplary computing device to receive, process and/or send information to/from an order entry device and/or the beverage dispenser according to some embodiments.

FIG. 16 illustrates a block diagram of an exemplary computing device 1600 to receive, process and/or send information to/from an order entry device and/or the beverage dispenser according to some embodiments. The computing device 1600 is able to be used to acquire, store, compute, communicate and/or display information. For example, the computing device 1600 is able to receive, translate and send requests related to beverage/item preparation. In general, a hardware structure suitable for implementing the computing device 1600 includes a network interface 1602, a memory 1604, a processor 1606, I/O device(s) 1608, a bus 1610 and a storage device 1612. The choice of processor is not critical as long as a suitable processor with sufficient speed is chosen. The memory 1604 is able to be any conventional computer memory known in the art. The storage device 1612 is able to include a hard drive, CDROM, CDRW, DVD, DVDRW, Blu-ray®, flash memory card, stick or drive, or any other storage device. The computing device 1600 is able to include one or more network interfaces 1602. An example of a network interface includes a network card connected to an Ethernet or other type of LAN. The I/O device(s) 1608 are able to include one or more of the following: keyboard, mouse, monitor, display, printer, modem, touchscreen, button interface and other devices. The I/O device(s) 1608 are used to set preferences and/or correct learned behaviors. Remote order application(s) 1630 used to perform the receiving, processing and sending order information method are likely to be stored in the storage device 1612 and memory 1604 and processed as applications are typically processed. More or less components shown in FIG. 16 are able to be included in the computing device 1600. In some embodiments, hardware 1620 is included. Although the computing device 1600 in FIG. 16 includes applications 1630 and hardware 1620, the remote order method is able to be implemented on a computing device in hardware, firmware, software or any combination thereof. For example, in some embodiments, the remote order applications 1630 are programmed in a memory and executed using a processor. In another example, in some embodiments, the customizing hardware 1620 is programmed hardware logic including gates specifically designed to implement the remote order method.

In some embodiments, the remote order application(s) 1630 include several applications and/or modules. As described herein, the modules are able to include an order acceptance module 120, an order flow module 122 and a dispenser interface module 124. The order acceptance module 120 is able to accept orders such as POS orders, kiosk orders, web orders, mobile POS orders, other device orders, and the orders are able to include payment. The order flow module 122 is able to control queues (e.g. using first in first out), flags to re-order back to a POS system and staged orders. The dispenser interface module 124 is able to provide load leveling across multiple machines, sequence integrity of orders, re-order data capture and complete machine control. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, an ebook reader, a television, a home entertainment system or any other suitable computing device.

There are different perspectives when utilizing the method of and system for processing remote orders. A user purchasing a beverage or other prepared item utilizes an order device to place an order and then retrieves the beverage or item after it has been prepared. The processing of the remote orders is generally hidden from the user. A Barista at a store receives orders, including orders placed from a remote location, and utilizes the machine interface to process the orders. Furthermore, the Barista or another person is able to review alerts, errors and other messages to make the process of preparing and serving beverages more efficiently. Store managers or other overseers are able to review data collected from the data device to ensure the business is operating efficiently.

In operation, the method of and system for processing remote orders solves issues with order delivery to a Barista, free drinks/pocket coffee and remote access to statistical data and settings. Further, the method of and system for processing remote orders increases consistency, speed of service, profitability, customer satisfaction and reduces training requirements. The system interface collects orders, sets recipes based upon item numbers from the sales orders and decides what machine type is being interfaced to format the message in the proper format. The system also takes into account location and delivery time based upon the order parameters collected from the sales orders. The system also sets interface parameters and delivers a set of brewing instructions to a brewing/dispensing machine or provides data to the machine in cases where the recipe is contained inside the coffee machine. The machine displays the order parameters on a screen integrated in the machine. A push of a button either manually or on the touch screen (or any other action) activates the machine to brew the ordered drink as sent to the machine by the interface software. The method and system are used to electronically interface orders from an order entry device into a coffee/espresso/cappuccino/other machine. Other machines include but are not limited to hot chocolate, Chai, soup, tea or similar brewing machines. This allows businesses to save time and improve accuracy of orders and reduce unrecorded drinks. Without this automated delivery system; drink orders get: 1) aged prior to delivery to customer 2) lost or forgotten 3) and in the manual order delivery environment drinks or orders are sometimes lost, 4) misread. Additionally, the system and method eliminate the noise from calling out drink orders to the drink preparation station. Through the business process orders are collected from order entry devices and routed to display on the screen of the coffee drink machine. This process also eliminates the waste caused by printed receipts or mismarked cups. A person would also use this method and system to remotely collect and report performance data, error data, machine alerts and machine parameters. Additionally, via remote connection, machine settings which control the operation of the machine such as display, brewing operation, drink item recipe, or other operational definitions are able to be changed or updated from a remote or centralized location.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

I claim:

1. A network of devices comprising:
   a. an order entry device for entering an order;
   b. a data device for processing the order received from the order entry device, wherein the data device maintains a city-wide order queue to prioritize orders among locations within a city; and
   c. a dispensing device for dispensing an item based on the order processed by the data device, wherein the data device determines a delivery location based upon a GPS location of a user and the city-wide order queue, wherein the dispensing device includes an order queue display to enable a user to view an order queue including orders of other users.

2. The network of devices of claim 1 wherein the order entry device is selected from the group consisting of a grocery/check out machine, a checkout kiosk, a point of sale device, a mobile device, a personal computer, a laptop, a netbook and a kiosk.

3. The network of devices of claim 1 wherein the dispensing device further comprises a brewing device.

4. The network of devices of claim 1 wherein the dispensing device contains one or more recipes for preparing the item to be dispensed.

5. The network of devices of claim 1 wherein the dispensing device is selected from the group consisting of a manual device, a semi-automatic device and a fully automatic device.

6. The network of devices of claim 1 wherein the dispensing device is selected from the group consisting of an espresso brewing machine, a coffee brewing machine, a tea brewing machine, a soup brewing machine, an ice cream machine, a smoothie machine and an iced coffee/tea machine.

7. The network of devices of claim 1 wherein the data device further comprises an application for selecting an order processing location and transmitting the order to the dispensing device at the order processing location.

8. The network of devices of claim 1 wherein the data device is for storing statistical data and performance data, wherein the performance data includes a comparison of revenue of a plurality of locations.

9. The network of devices of claim 1 wherein the data device is for storing error data, wherein the error data includes codes defined for each type of error, machine information and location information.

10. The network of devices of claim 1 wherein the data device is for storing alerts, wherein the alerts specify which device an alert is for and what specifically needs to be addressed for the device to function properly.

11. The network of devices of claim 1 wherein data stored in the data device is stored in a database and is reported to a reporting system.

12. The network of devices of claim 11 wherein the reporting system dispatches the data to a messaging system.

13. The network of devices of claim 1 wherein the data device receives the order in a first format and translates the order into a second format that the dispensing device understands.

14. The network of devices of claim 1 wherein the data device determines a delivery location based upon at least one of order parameters and a selected delivery location.

15. The network of devices of claim 1 wherein the data device records data of all items dispensed.

16. The network of devices of claim 1 wherein the delivery location includes a location with a shortest wait time within a user-specified distance of a current location of a user.

17. The network of devices of claim 1 wherein the data device implements load balancing wherein orders are sent to various dispensing devices to maintain a balanced load on the dispensing devices.

18. The network of devices of claim 1 wherein the data device enables future orders to be placed.

19. The network of devices of claim 1 wherein the data device changes at least one of settings and recipes on the dispenser device.

20. The network of devices of claim 1 wherein the data device sends a base setting to dispenser devices and delta settings based on a location of each of the dispenser devices.

21. A system for processing customer orders comprising:
 a. a memory for storing an application, the application comprising:
  i. an order acceptance module for accepting orders;
  ii. an order flow module for controlling a flow of the orders received from the order acceptance module, wherein the orders are included in a city-wide order queue to prioritize orders among locations within a city; and
  iii. a dispenser interface module for providing dispensing control of the orders received from the order flow module, wherein the dispenser interface module includes an order queue display to enable a user to view an order queue including orders of other users; and
 b. a processor for processing the application.

22. The system of claim 21 wherein the orders are selected from the group consisting of point of sale orders, kiosk orders, web orders, mobile orders, point of service orders and remote orders.

23. The system of claim 21 wherein providing dispensing control includes providing load leveling across multiple machines, sequence integrity of the orders, re-order data capture and machine control.

24. The system of claim 21 wherein the dispensing interface module is further for translating commands from a first format to a second format.

25. A method of processing customer orders programmed in a non-transitory memory of a device comprising:
 a. collecting the orders at an order entry device;
 b. transmitting the orders to a point of delivery device for processing the orders, wherein the point of delivery device includes an order queue display to enable a user to view an order queue including orders of other users, wherein the order queue is comprises a city-wide order queue to prioritize orders among locations within a city; and
 c. updating machine settings at the point of delivery device.

26. The method of claim 25 further comprising prioritizing and queuing the orders.

27. The method of claim 25 further comprising identifying the point of delivery device for each of the orders.

28. The method of claim 25 wherein transmitting the orders to the point of delivery device includes translating the orders from a first format to a second format.

29. The method of claim 25 wherein collecting the orders includes a customer ordering without verbal communication.

30. The method of claim 25 wherein the point of delivery device comprises a brewing and dispensing device.

31. The method of claim 25 wherein the point of delivery device comprises one or more recipes which are utilized to process the orders.

32. The method of claim 25 further comprising determining a location of the point of delivery device based upon at least one of order parameters, a GPS location and a selected delivery location.

33. The method of claim 25 further comprising maintaining an order queue to prioritize the orders.

34. The method of claim 25 further comprising implementing load balancing wherein the orders are sent to various point of delivery devices to maintain a balanced load on the point of delivery devices.

35. A device comprising:
 a. a memory for storing an application, the application for:
  i. communicating periodic future orders with an order entry device; and
  ii. communicating with a point of delivery device, wherein the application is further for determining a location of the point of delivery device based upon a GPS location and a city-wide order queue that prioritizes orders among locations within a city, wherein the point of delivery device comprises a brewing and dispensing device, wherein the point of delivery device includes an order queue display to enable a user to view an order queue including orders of other users; and b. a processing component coupled to the memory, the processing component for processing the application.

36. The device of claim 35 wherein the application is further for prioritizing and queuing orders.

37. The device of claim 35 wherein the application is further for identifying the point of delivery device for orders.

38. The device of claim 35 wherein the application is further for transmitting orders to the point of delivery device including translating the orders from a first format to a second format.

39. The device of claim 35 wherein the application is further for updating machine settings at the point of delivery device.

40. The device of claim 35 wherein the point of delivery device comprises one or more recipes which are utilized to process orders.

41. The device of claim 35 wherein the application is further for determining a location of the point of delivery device based upon at least one of order parameters and a selected delivery location.

42. The device of claim 35 wherein the application is further for implementing load balancing wherein orders are sent to various point of delivery devices to maintain a balanced load on the point of delivery devices.

43. A system for collecting and storing data comprising:
a. a distributed beverage making and dispensing device; and
b. a centralized data device containing an application having a database and an interface that collects the data from the distributed beverage making and dispensing device and stores the data in the database, wherein the centralized data device sends a base setting to distributed beverage making and dispensing devices and delta settings based on characteristics of a location of each of the distributed beverage making and dispensing devices, wherein the centralized data device maintains a city-wide order queue to prioritize orders among locations within a city and further wherein the data device determines a delivery location based upon a GPS location of a user and the city-wide order queue.

44. The system of claim 43 wherein the beverage making and dispensing device and the data device communicate using at least one of a serial protocol and a network protocol.

45. The system of claim 43 wherein the data comprises statistical data and performance data, wherein the performance data includes a comparison of revenue of a plurality of locations.

46. The system of claim 43 wherein the data comprises error data, wherein the error data includes codes defined for each type of error, machine information and location information.

47. The system of claim 43 wherein the data comprises alerts, wherein the alerts specify which device an alert is for and what specifically needs to be addressed for the device to function properly.

48. The system of claim 43 wherein the data is stored in a database and is reported to a reporting system.

49. The system of claim 48 wherein the reporting system dispatches the data to a messaging system.

50. A method of processing customer orders programmed in a non-transitory memory of a device comprising:
a. collecting the orders at an order entry device; and
b. transmitting the orders to a point of delivery device for processing the orders, wherein the point of delivery device includes an order queue display to enable a user to view an order queue including orders of other users, wherein the order queue is comprises a city-wide order queue to prioritize orders among locations within a city, wherein the point of delivery device comprises a brewing and dispensing device.

51. The method of claim 50 further comprising prioritizing and queuing the orders.

52. The method of claim 50 further comprising identifying the point of delivery device for each of the orders.

53. The method of claim 50 wherein transmitting the orders to the point of delivery device includes translating the orders from a first format to a second format.

54. The method of claim 50 wherein collecting the orders includes a customer ordering without verbal communication.

55. The method of claim 50 wherein the point of delivery device comprises one or more recipes which are utilized to process the orders.

56. The method of claim 50 further comprising determining a location of the point of delivery device based upon at least one of order parameters, a GPS location and a selected delivery location.

57. The method of claim 50 further comprising maintaining an order queue to prioritize the orders.

58. The method of claim 50 further comprising implementing load balancing wherein the orders are sent to various point of delivery devices to maintain a balanced load on the point of delivery devices.

\* \* \* \* \*